Sept. 23, 1969  L. H. RUPLE  3,468,150
CLUSTER ROLL ASSEMBLY FOR TUBE MILLS
Filed April 13, 1967  2 Sheets-Sheet 1

INVENTOR
LEWIS H RUPLE
BY
Prasez, Wilson & Prasez
ATTORNEYS

Sept. 23, 1969      L. H. RUPLE      3,468,150

CLUSTER ROLL ASSEMBLY FOR TUBE MILLS

Filed April 13, 1967      2 Sheets-Sheet 2

INVENTOR.
LEWIS H. RUPLE

ATTORNEYS

United States Patent Office 3,468,150
Patented Sept. 23, 1969

3,468,150
CLUSTER ROLL ASSEMBLY FOR TUBE MILLS
Lewis H. Ruple, Toledo, Ohio, assignor to The Abbey-Etna Machine Company, Perrysburg, Ohio, a corporation of Ohio
Filed Apr. 13, 1967, Ser. No. 630,656
Int. Cl. B21d 5/08
U.S. Cl. 72—178                                    1 Claim

ABSTRACT OF THE DISCLOSURE

Tube forming apparatus for manufacturing metal tubing from a source of strip stock which is caused to pass through a series of forming stages, the initially flat strip of stock is gradually formed into a tubular shape. The final forming stage comprises cooperating forming rolls which are contoured to contact only a relatively small portion of the under surface of the strip stock being formed and may be adjusted horizontally, vertically, and angularly in a vertical plane transverse to the longitudinal axis of the tubing being formed.

BACKGROUND OF THE INVENTION

*Field of the invention.*—The invention relates to metal deforming apparatus including an instrumentality, or step of using an instrumentality, into which work is serially introduced in an original direction along a path, and which instrumentality functions to divert the work away from such path wherein longitudinally consecutive cross-sections of the work (the cross-sections being taken at right angles to the original direction and each cross-section having width and breadth dimensions) pass through the instrumentality, and one of the dimensions of the consecutive cross-sections is diverted about at least one longitudinally extending axis of bend with substantially no change in the magnitude of either dimension.

Basically, the apparatus is effective to reshape the cross-sectional configuration of the work by bending the same about a longitudinal axis of bend so as to form a trough and thence a tube.

*Description of the prior art.*—In the conventional tube mills for manufacturing metal tubing from a source of strip stock, the metal strip is caused to travel through the various forming stages of the mill wherein the initially flat strip of metal is gradually formed into a tubular shape. At the output end of the mill, the free edges of the strip of metal are brought into contact with one another and are suitably joined together typically by a butt seam welding operation. Finally, the continuous tube is cut into desired lengths completing the manufacturing cycle.

The diameter of the tubing being manufactured is determined by the final forming station positioned near the output end of the mill. Conventionally, this forming station includes an assembly of cooperating forming rolls which are contoured to form a particular diameter tube. This group of forming rolls is sometimes referred to as a "cluster assembly." When it is desired to manufacture a different diameter tubing or when the wall thickness or metal content of the strip stock is varied, the rolls of the cluster assembly may be adjusted to manufacture and produce the desired tubing. Such apparatus is clearly illustrated and described in United States Patent 3,159,199, entitled "Cluster Roll Assembly for Tube Mills," Lewis H. Ruple. In such tube mill apparatus the pairs of forming rolls are respectively spaced horizontally from each other and the rolls of advancing pairs are progressively disposed closer to each other thereby gradually to cause the marginal edges of the strip being formed to approach each other to effect an annular cross-section. The mounting means for the forming rolls is adjustable for selective horizontal and vertical movement with a plane normal to the path of travel of the strip wherein the forming rolls may be selectively adjusted relative to the supporting roll means of the mill to accommodate strips of metal of various widths and thicknesses for use in the forming of tubes of different diameters. It has been found that in certan instances it is desirable to provide the roll supporting means with a further adjustment in a vertical plane normal or at right angles to the longitudinal axis of the tubing being formed.

It is an object of the present invention to produce a cluster roll assembly for manufacturing tubing from strip stock wherein the forming rolls are adjustable horizontally, vertically, and angularly in a plane perpendicular to the longitudinal axis of the tubing being formed.

SUMMARY

The objects and advantages of the invention may be achieved by a cluster roll assembly for a tube mill for forming from a continuous flat strip of metal or tube of a predetermined selected diameter, wherein the flat strip is caused to be moved along a predetermined path and initially formed into a generally U-shaped cross-section; roll means rotatable on a horizontal axis for supporting the strip along the longitudinal axis thereof; a plurality of pairs of opposed laterally spaced forming rolls disposed above and in spaced relation to the supporting roll means, the forming rolls having a tube-forming surface, each of the forming surfaces being contoured to contact substantially only a small portion of the under-surface of the strip adjacent to and including the marginal edges thereof, the pairs of forming rolls being respectively spaced horizontally from each other and the rolls of advancing pairs being progressively disposed closer to each other thereby gradually to cause the marginal edges of the strip to approach each other to effect an angular cross-section; and mounting means for the forming rolls to enable the some to rotate about axes lying in a plane normal to the path of travel of the strip and disposed on opposite sides of the supporting roll means, the mounting means being effective to selectively adjust the axes of rotation of the forming rolls horizontally, vertically, and angularly within the plane normal to the path of travel of the strip.

BRIEF DESCRIPTION OF THE DRAWINGS

The above and other objects and advantages of the invention will become clearly apparent to one skilled in the art from considering the following detailed description of an embodiment of the invention in the light of the accompanying drawings, in which.

DESCRIPTION OF PREFERRED EMBODIMENT

Figure 1:
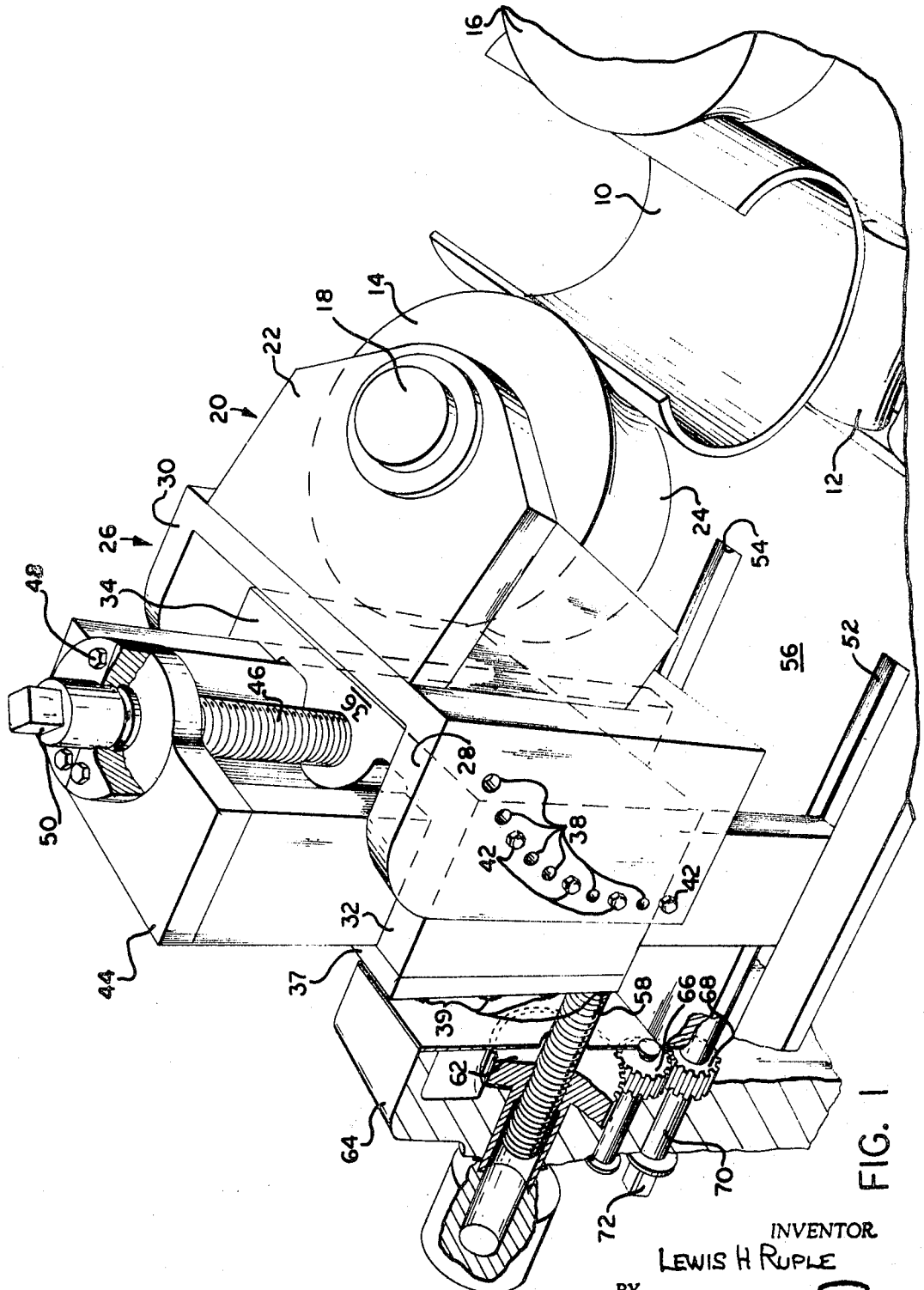
FIGURE 1 is a fragmentary perspective view of the mounting means for one forming roll of a cluster assembly of a tube mill.

Referring to the drawings, there is shown a cluster roll assembly for effecting a terminal forming operation on a strip of metal being manufactured into a tubular shape. The strip 10 of metal is typically initially formed into a U-shaped cross-section prior to the point at which the first position of the roll members of the cluster contact the outer or under surface thereof. A supporting roll assembly, formed of a plurality of spaced supporting rolls 12, is positioned on a suitable base or support to support the strip 10 along the central longitudinal axis thereof.

The forming rolls of the cluster roll assembly are typically disposed on opposite sides of the supporting roll assembly, and are arranged in pairs which are respectively spaced horizontally from each other and the rolls of advancing pairs are progressively disposed closer to each other thereby to gradually cause the marginal edges of the strip 10 being formed to approach each other to eventually form the strip 10 into an annular cross-section.

FIGURE 1 shows one of the pairs of forming rolls of the cluster roll assembly which comprises cooperating forming rolls 14 and 16. Since each of the forming rolls of the cluster roll assembly is mounted in a similar manner, specific description of only a single forming roll and its associated mounting structure need be described. The forming roll 14 is mounted for rotation about a generally vertically disposed spindle indicated by reference numeral 18. The opposite ends of the spindle 18 are rotatably journalled within a clevis 20 having an upper member 22 and a lower member 24. The upper and lower members 22 and 24 of the clevis 20 are affixed to a channel-shaped portion 26 having spaced rearwardly extending side walls 28 and 30, the inner surfaces of which are adapted to fit in close proximity to the outer surfaces of the rearwardly extending side walls 32 and 34, respectively, of a slide element 36. The side walls 28 and 30 are provided with a plurality of spaced apart apertures 38 which have their centers positioned on an arc having a common radius. The side walls 32 and 34 of the slide element 36 are likewise provided with a plurality of spaced apart internally threaded apertures (not shown) which are arranged in an arcuate fashion on the same radius as the apertures 38 of the side wall 28 and 30. The spacing between the internally threaded apertures is typically twice as much as the spacing between the apertures 38. It will be appreciated that in order to effect an angular adjustment of the clevis 20 with respect to the slide 36, certain of the apertures 38 of the clevis need by aligned with the internally threaded apertures of the slide 36, and threaded bolts 42 are then inserted through the apertures 38 and thence threadably engaged in the internally threaded apertures.

The inner surfaces of the side walls 32 and 34 of the slide element 36 are disposed in sliding relation on the opposite outer walls of an upstanding standard 44. The upper portion of the slide element 36 is provided with a vertically extending internally threaded hole for receiving a threaded shank 46 which is adapted to be rotatably journalled within a suitable bushing 48 formed in the upper portion of the standard 44. The uppermost end of the threaded shank 46 includes a head 50 for receiving a suitable operating crank.

The slide element 36 is held on the upstanding standard 44 in sliding relation therewith by suitably disposed gibs threadably secured to the rear surfaces of the side walls 32 and 34, only one of which is illustrated in the drawings. More specifically, a gib 37 is shown as being threadably fastened to the side wall 32 by means of threaded fasteners 39.

The disposition of the slide element 36, the associated clevis 20 and the forming roll 14 may be vertically varied by turning the head 50 and the associated threaded shank 46. By turning the head 50 in one direction, the cooperation between the external threads of the shank 46 and the internal threads of the hole in the upper portion of the slide element will cause the entire assembly to move upwardly; while the reverse rotation of the head 50 will cause the assembly to move downwardly.

Figure 2:
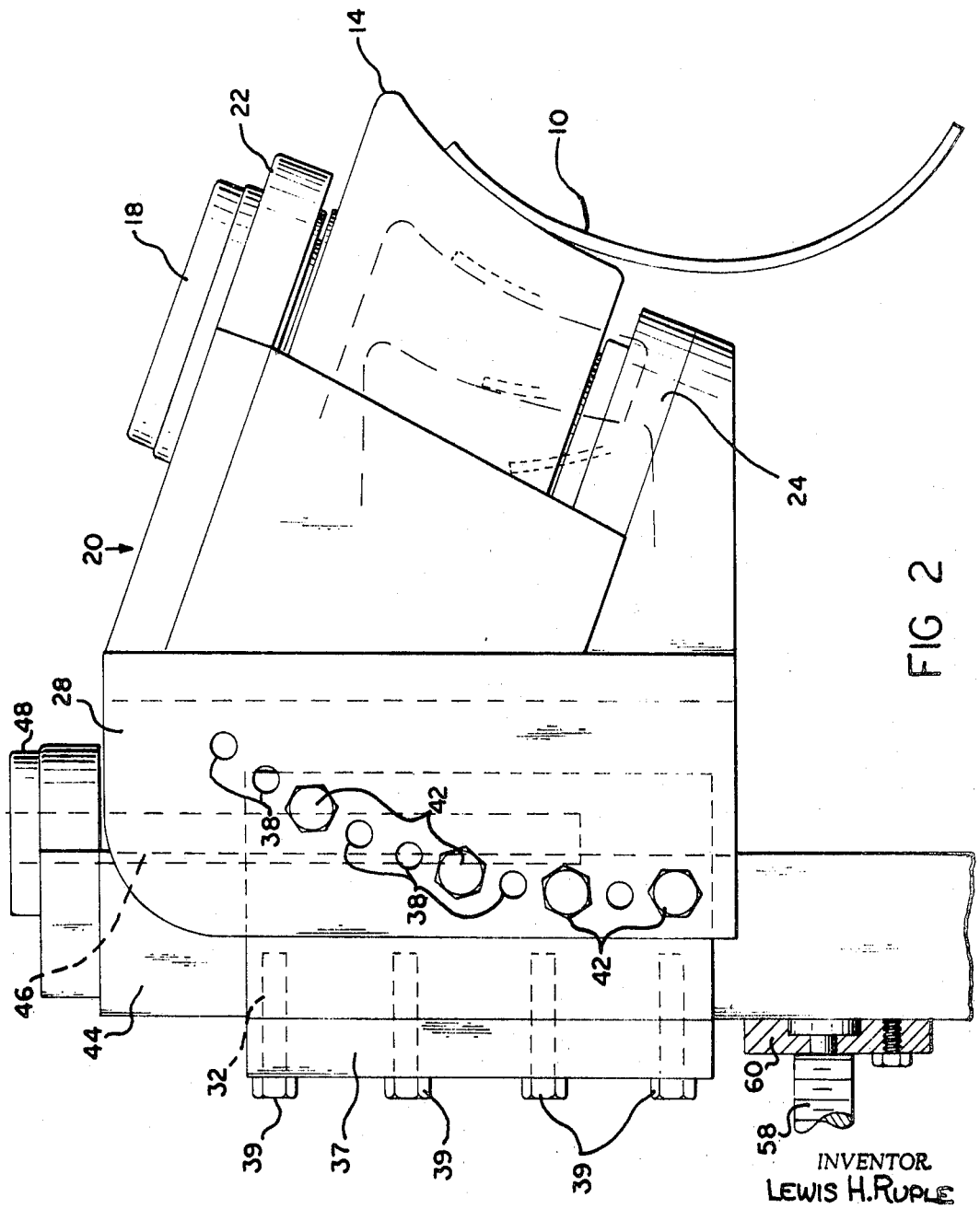
FIGURE 2 is a fragmentary elevational view of the structure illustrated in FIGURE 1.

The upstanding standard 44 is supported by and adapted to slide within a pair of suitably disposed spaced apart ways 52 and 54 formed in a base or platform 56. Horizontal movement of the forming roll 14 is effected by horizontal movement of the standard 44 in the ways 52 and 54. Such movement is typically achieved by a gear-screw arrangement which includes a threaded shank 58 having one end thereof fixedly pivotally secured to a plate 60 (FIGURE 2) attached to the standard 44. The opposite end of the shank 58 is received within the threaded interior of a gear 62 journalled for rotational movement about its axis within an upright portion 64 of the platform 56. Rotational movement of the gear 62 is achieved through an associated idler gear 66 and a drive gear 68 both being suitably journalled within the upright portion 64. The drive gear 68 is keyed or otherwise affixed to a drive rod 70 which may be turned or rotated by a head 72 integral with or affixed to one end of the drive rod 70. By turning the head 72, rotational movement of the associated gears 68, 66 and 62 will be achieved. Movement of the gear 62 in one direction will cause the threaded shank 58 to be drawn up within the internally threaded interior of the gear 62; while opposite movement of the gear 62 will effect an opposite movement of the threaded shank 58. Since the threaded shank 58 has one of its ends pivotally secured to the upright standard 44, the rotational movement of the gear 62 will simultaneously effect the sliding movement of the standard 44, and its associated forming roll member 14, along the ways 52 and 54.

It has been found that satisfactory forming operations are achieved by contouring the forming surfaces of each of the individual roll members 14 and 16 on the same radius and varying the center point from which this radius is swung, as more clearly indicated and described in United States Patent 3,159,199, entitled "Cluster Roll Assembly for Tube Mills," L. H. Ruple.

In operation, the cluster roll assembly embodying the invention is initially set up by adjusting the heads 50 and 72 which, in turn, determine the vertical position of the clevis 20 and its associated forming roll 14 and the horizontal position of the upstanding standard 44, respectively. The adjustments to be made are determined by the size of the tube to be manufactured and the particular metal of the strip being employed. When employing certain gauges of metal strip to be formed, it has been found desirable to overform the butting edges to avoid any tendency of a "springback" and in these instances the clevis assembly 20 is adjusted to apply a greater force generally downwardly on the edges to be butted. Such adjustment, to date, has been accomplished through imperical methods until the desired overforming has been achieved.

With the cluster roll assembly adjusted in accordance with the above description, the strip 10 enters the first pass of the cluster roll assembly substantially in a U-shaped cross-section. The cooperating forming rolls then act further to form the strip 10 causing the same to approach a cylindrical shape. Subsequent to the last pass of the cluster roll assembly, which typically comprises three pairs of cooperating forming rolls, the form strip is fed into a fin roll assembly which trues the butting edges before the edges are suitably welded together to form an integral pipe or tube.

In the light of the above description, it will be appreciated that the apparatus of the invention has produced a method and apparatus for manufacturing tubing or pipe wherein by relatively simple adjustments, the apparatus can be readily changed for manufacturing tubing or pipe of differing gauges and diameters with considerable facility. In addition, minor adjustments can be easily made to compensate for changes in both thickness and physical properties of the material being used to fabricate the finished tubing or pipe.

In accordance with the provisions of the patent statutes I have explained the principle and mode of operation of my invention and have illustrated and described what I now consider to represent its best embodiment. However, I desire to have it understood that within the scope of the appended claim, the invention may be practiced otherwise than as specifically illustrated and described.

What I claim is:

1. In a universal apparatus for forming from a continuous flat strip of metal a tube of a predetermined selected diameter, wherein the flat strip is caused to be moved along a predetermined path and initially formed into a generally U-shaped cross section; roll means rotatable on a horizontal axis for supporting said strip along the longitudinal axis thereof; a plurality of pairs of opposed laterally spaced forming rolls disposed above and in spaced relation to said supporting roll means, said forming rolls having a curved forming surface, each of the forming surfaces having substantially the same radius of curvature and being contoured to contact substantially only a small portion of the under surface of said strip adjacent to and including the marginal edges thereof, said pairs of forming rolls being respectively spaced horizontally from each other and the rolls of advancing pairs being progressively disposed closer to each other thereby gradually to cause the marginal edges of the strip to approach each other to effect an annular cross section; and mounting means for said forming rolls to enable same to rotate about axes normal to the path of travel of said strip and disposed on opposite sides of said supporting roll means, said mounting means being adjustable for selective horizontal, vertical and angular movement within a plane normal to the path of travel of said strip wherein said forming rolls may be selectively adjusted relative to said supporting roll means to accommodate strips of metal of various widths and thicknesses for use in the forming of tubes of different diameters, said mounting means including a horizontally shiftable member; a vertically shiftable member mounted for relative sliding movement on said horizontally shiftable movement; a clevis rotatably supporting one of said forming rolls mounted for relative angular adjustment in a vertical plane on said vertically shiftable member, said vertically shiftable member being provided with a set of arcuately disposed threaded fastener receiving apertures; said clevis being provided with a set of threaded fastener receiving apertures disposed in an arcuate path coincident with said apertures of said vertically shiftable member; and threaded fasteners for insertion through the selected ones of said apertures of said clevis into aligned apertures in said vertically shiftable member to affix said clevis to said vertically shiftable member.

References Cited

UNITED STATES PATENTS

| | | | |
|---|---|---|---|
| 2,098,989 | 11/1937 | Yoder | 72—181 |
| 3,159,199 | 12/1964 | Ruple | 72—178 X |
| 3,323,341 | 6/1967 | Chang | 72—178 |

MILTON S. MEHR, Primary Examiner